July 17, 1951  E. W. HEROLD  2,560,952
QUANTITATIVE GAS MEASURING
Filed Feb. 25, 1949  2 Sheets-Sheet 1
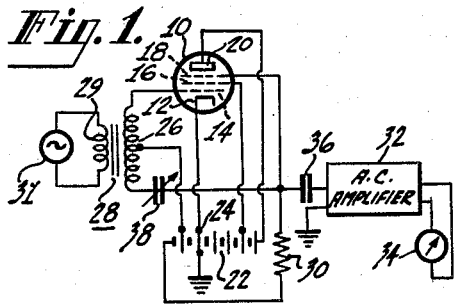
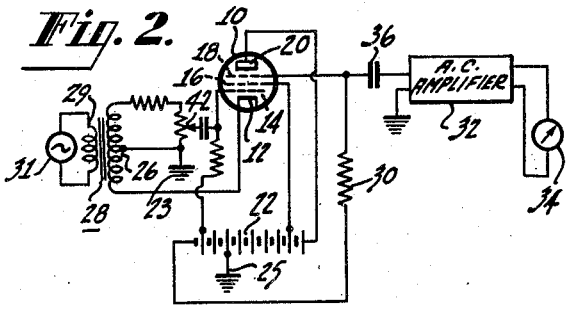
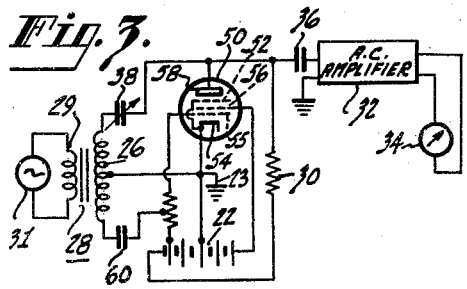
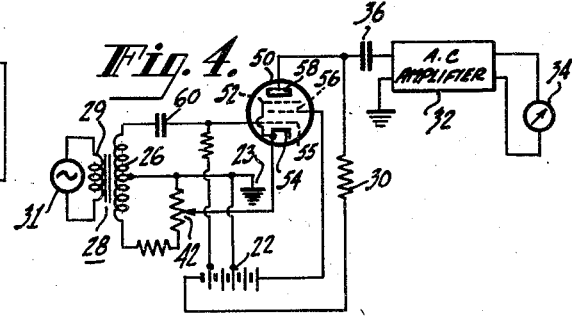
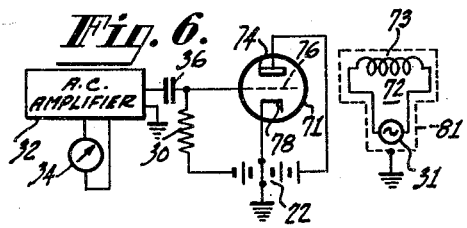
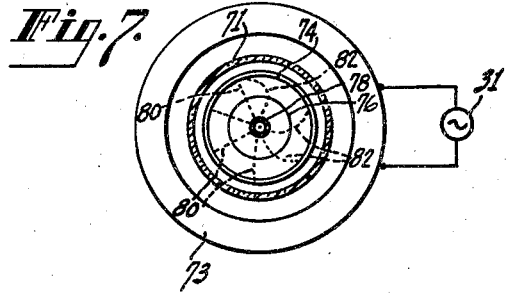
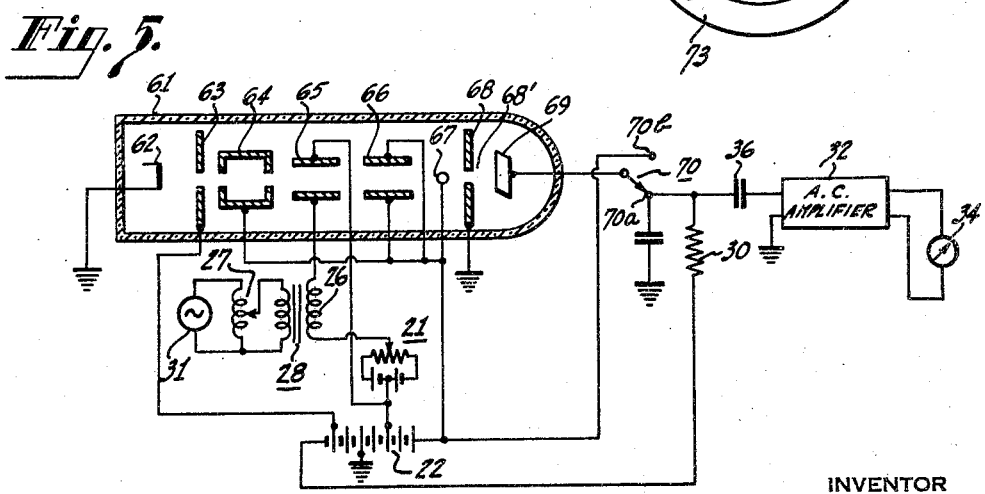
INVENTOR
EDWARD W. HEROLD
BY
ATTORNEY July 17, 1951   E. W. HEROLD   2,560,952
QUANTITATIVE GAS MEASURING
Filed Feb. 25, 1949   2 Sheets-Sheet 2
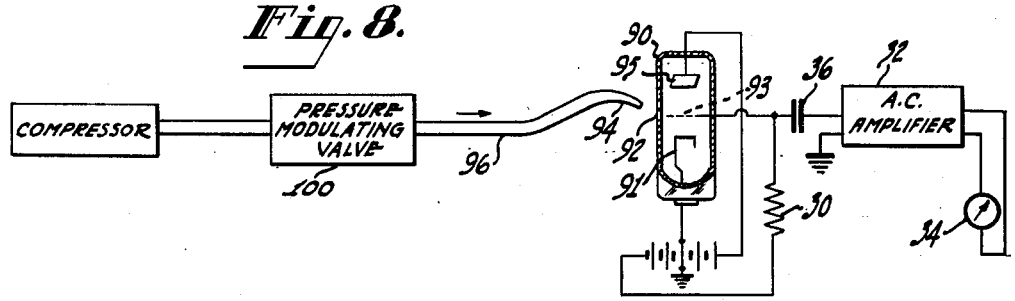
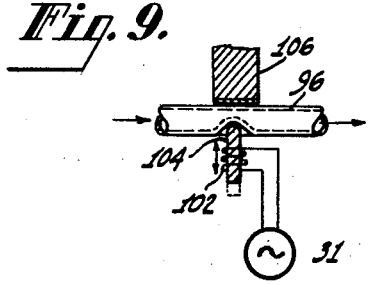
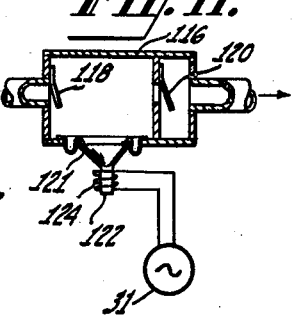
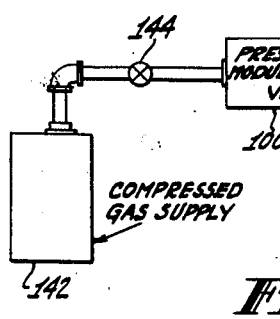
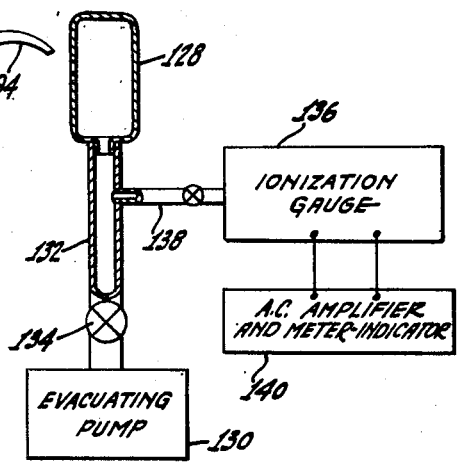
INVENTOR
EDWARD W HEROLD
BY
ATTORNEY Patented July 17, 1951

2,560,952

UNITED STATES PATENT OFFICE 2,560,952

QUANTITATIVE GAS MEASURING

Edward W. Herold, Kingston, N. J., assignor to Radio Corporation of America, a corporation of Delaware Application February 25, 1949, Serial No. 78,448

24 Claims. (Cl. 315—364)

This invention relates to improvements in the art of quantitative gas-measuring, and while not limited thereto, finds particular application in testing vacuum tubes and the like.

One of the most troublesome problems in the manufacture and testing of high-vacuum electron tubes is the quantitative measurement of gas in the tubes. It is well known that gas in a vacuum tube will ionize when the gas molecules are bombarded by the electrons in the normal electron stream in the tube. An excess of gas in the tube may interfere with internal electronic behavior, and may also lead to irreparable damage due to the flow of positive ions to the negatively biased control grid of the tube, accompanied by a loss of negative bias on the control grid and excessive electron current flow. The presence of excess gas may be due to improper evacuation techniques or to the influx of gas through small leaks after the tube has been sealed off. In either event, it is important to have an accurate, reliable method for measuring the gas content of vacuum tubes, not only for the sake of detecting the presence of excess gas during or on completion of the evacuation procedure, but also to serve as a reliable basis of comparison for gas leakage tests.

It has already been proposed to make quantitative gas measurements with vacuum tubes by collecting the positive gas ions resulting from electron bombardment of gas molecules, at a negatively biased electrode in the tube, and measuring the resultant ion current in the biasing circuit (the term "ion current" being used herein and in the appended claims to designate an electric current developed by the flow of electrically charged ions). In the usual case, the apparent ion current is measured with a sensitive D. C. microammeter, the theory being that the indication given by the microammeter will be proportional to the amount of ionized gas in the tube. In the case of an ordinary pentode vacuum tube for example, gas in the tube may be ionized by passing electron current through the tube, and the resultant positive ions can be collected at the control grid or at the suppressor grid by applying a negative potential thereto. Unfortunately, this method of measuring gas pressure is subject to considerable inaccuracy due to the obscuring "background effect" of electric currents which may be set up across the tube electrode supports and other portions of the tube structure. For example, with a tube having a negative control-grid voltage of the order of ten volts and a positive anode voltage of the order of one hundred volts, a leakage path of 100 megohms between the positive anode and the negatively biased ion-collecting grid will carry a leakage current of 1 microampere, and this leakage current will be measured together with any true ion current. In order to distinguish between ion current and leakage current, a second current measurement is sometimes made, with normal anode voltage applied to the tube, but with the electron current cut off by opening the cathode circuit, by turning off the cathode heater, or by using a control grid bias well beyond cut off. The theory underlying this procedure is that the leakage current will continue, while the ion current will cease, thus permitting comparison between ion-plus-leakage current and leakage current alone. However, leakage currents are extremely variable, and may change rapidly with tube temperature. Furthermore, when the applied voltages are changed, or when one or more of the tube circuits is opened, the leakage paths will change, causing a resultant change in leakage current.

The inherent mixing of leakage current and ion current outlined above precludes any accurate evaluation of vacuum tubes having very low amounts of residual gas. As a practical matter, all tubes showing less than, say, $10^{-7}$ amperes of ion current are usually assumed to have equal residual gas content, although there may be differences as high as one hundred to one between the residual gas content of individual tubes. One the other hand, in making life tests of highly evacuated tubes, it is extremely important to be able to differentiate between the initial gas pressures in any group of tubes under test in order to correlate tube life data with residual gas data, even though the actual amount of gas present may be well below the danger point. An accurate measurement of initial residual gas content is also essential to immediate detection of increases in gas content due to imperfect seals and other gas leaks.

Closely allied with the problems of measuring residual gas content, and detecting leaks, is the problem of locating leaks in vacuum tubes and vacuum systems. It has already been proposed to locate leaks in vacuum tubes and analogous evacuated envelopes by "scanning" or "probing" the surface of the tubes with a stream of gas while maintaining a close observation of the internal gas pressure of the tube. For convenience, this general technique for leak location is referred to herein and in the appended claims as "gas-scanning." The major difficulty in prior art gas-scanning techniques for leak location resides in positively identifying the gas entering the tube through a leak as the stream of gas passes over the leak. Leak location by scanning with special tracer gases, such as hydrogen and helium (see e. g. Review of Scientific Instruments, vol. 16, pages 273–275, October 1945, and vol. 17, pages 368–372, October 1946; Journal of Applied Physics, vol. 18, pages 30–48, January 1947), offers material advantages over previously known leak location methods, but difficulties due to tracer gas already in the tube are not entirely overcome, and special, expensive equipment is required. In all such tests, the object is, of course, to detect incremental increases in the amount of test gas in the tube when the gas stream is brought near a leak. However, the presence of any of the test gas in the tube or in the evacuating system prior to an incremental increase thereof tends to obscure the desired indication. Moreover, prior art gas-scanning techniques for leak location have been limited in applicability to unsealed tubes, and are not available once a tube has been disconnected from the evacuating system. Nevertheless, the increasing number and complexity of glass-to-metal seals and similar points of possible leakage in vacuum tubes and vacuum systems points to an increased need for simplified, accurate test methods and apparatus. As in the case of simple residual gas measurements, leak location by measurement of ionized gas current within the vessel being tested (or in auxiliary gages when tracer gases are utilized), is complicated by the presence of undesired background effects which tend to obscure the desired indication. For example, in the gas-scanning method of locating leaks, the surface of the tube being tested is scanned with a nozzle having the test gas issuing therefrom, while the amount of the test gas in the tube is continuously measured. As the scanning nozzle passes a point of leakage in the tube surface, the measuring instrument should show some change in the quantity of gas within the tube, indicating the presence of a leak adjacent the nozzle. However, if the initial gas content of the tube includes any of the test gas, then the change registered by the measuring instrument due to a change in the gas content of the tube will be relatively small, and is often difficult to detect. Here, again, as in the case of simple gas content measurements, it is to be noted that the difficulty arises from inability to distinguish between two phenomena, each of which tend to produce similar indications on a measuring device.

It is, accordingly, a principal object of the present invention to provide an improved method of and apparatus for quantitative gas measurements wherein interfering background effects are largely eliminated.

Another object of the invention is to provide an improved method of and apparatus for determining the gas content of evacuated envelopes, such as vacuum tubes.

A further object of the invention is the provision of an improved method of and apparatus for detecting leaks in evacuated envelopes.

Another object of the invention is to provide an improved method of and apparatus for accurately locating leaks in evacuated envelopes.

According to the invention, the foregoing and other objects and advantages are attained by ionizing the gas to be measured at a cyclically varying rate to produce a similarly varying ion current, without causing variations in currents arising from interfering sources, such as previously ionized gas, or electrical leakage currents, in order to distinguish between desired and undesired currents in a current measuring instrument. In measuring the gas content of a vacuum tube for example, cyclical variations in ionization can be accomplished by cyclically varying either the intensity or the path length of the electron space current through the tube in order to vary the amount of ionized gas present from instant to instant. In the case of locating leaks in vacuum tubes, the same result can be achieved by cyclically varying the amount of gas passing into a tube through a leak, so that the gas entering the tube through a leak can be readily identified in spite of background effects due to quantities of gas previously in the tube.

A more complete understanding of the invention may be had by reference to the following description of illustrative embodiments thereof, when considered in connection with the accompanying drawings, wherein:

Figure 1 is a schematic diagram of apparatus arranged in accordance with the invention for measuring the gas content of a pentode vacuum tube, Figures 2, 3, and 4 show modified forms of the apparatus of Fig. 1, Figure 5 is a schematic diagram of apparatus for measuring the gas content of a beam-deflection-mixer type vacuum tube in accordance with the invention, Figures 6 and 7 illustrate a further modified form of apparatus for quantitative gas measurements in accordance with the invention, Figure 8 illustrates a vacuum tube leak locating apparatus arranged in accordance with the invention, Figures 9, 10, and 11 show pressure modulating valves suitable for use in the apparatus of Fig. 8, and Figure 12 illustrates a modification of the apparatus shown in Fig. 8.

As previously stated, the present invention contemplates ion-current type quantitative gas measurements wherein ion currents developed from ions of the gas to be measured are distinguished from other interfering currents by cyclically varying the ionization of the gas to be measured. One embodiment of apparatus for carrying the invention into effect is illustrated in Fig. 1, wherein there is shown apparatus arranged in accordance with the invention for measuring the gas content of a pentode vacuum tube 10 which contains a cathode 12, a control grid 14, a screen grid 16, a suppressor grid 18, and an anode 20. The apparatus of Fig. 1 comprises a source of D. C. voltage, such as a battery 22, for supplying positive voltages to the anode 20 and to the screen grid 16 of the tube 10, and for supplying negative voltages to the suppressor grid 18 and the control grid 14 of the tube 10. These voltages may be the same as those normally employed in the operation of the tube, or may be modified according to the purposes of the measurement. The control grid 14 is connected to the battery 22 through one section of the secondary winding 26 of a transformer 28, the primary winding 29 of which is connected to a source of A. C. voltage 31. The suppressor grid 18 of the tube 10 is connected to the battery 22 through an impedance element shown in the drawing as a resistor 30. A measuring network, consisting of an A. C. amplifier 32 and an indicating device, such as a meter 34, is connected across the load resistor 30 through a coupling capacitor 36. Amplifier 32 and indicator 34 are shown in simplified form and may consist of any of the conventional devices for amplifying and measuring small alternating voltages, e. g. a cascade electron-tube amplifier and output meter.

In the apparatus of Fig. 1, as thus far described, any gas in the tube 10 will be ionized by the flow of electron space current through the tube 10 from the cathode 12 to the anode 20. The negatively biased suppressor grid 18 will serve as an ion-collecting electrode, so that an ion current will be developed in the suppressor grid circuit. If the ionization of the residual gas in the tube 10 were to occur at a substantially constant rate, as in the prior art methods of residual gas measurement, it would be difficult to evaluate the current flow through the load resistor 30, due to the masking effect of leakage currents as was previously described. However, with an A. C. voltage applied to the control grid 14 of the tube 10 through the transformer 28, the electron current flow in the tube 10 will vary cyclically, with a corresponding cyclical variation in the ionization of residual gas in the tube. At the same time, the leakage currents flowing to the suppressor grid 18 through the dielectric portions of the tube structure will be substantially constant. The flow of current through the load resistor 30 will develop a cyclically varying D. C. voltage, due to cyclically varying ion current, superimposed on a substantially unvarying, leakage-current, D. C. voltage. The unvarying component of the voltage across the load resistor 30 will be blocked out by the capacitor 36, so that the only voltage appearing at he input to the amplifier 32 will be an A. C. voltage, substantially all of which will be due to variations in the flow of ion current through the resistor 30. Accordingly, the indication given by the meter 34 will represent chiefly the gas content of the tube 10.

It is possible that transient leakage currents or "noise" voltages in the tube 10 may cause small A. C. voltages to appear at the input to the amplifier 32. In order to eliminate random effects of this type, it is deemed preferable to use a frequency-selective amplifier for the amplifier 32. For example, an amplifier of the so-called "lock-in" type, described in Review of Scientific Instruments, vol. 12, pp. 444-447, September 1941, is suitable. However, in many instances it has been found that the inherent sensitivity of the present method of gas measurement makes the use of selectivity in the amplifier 32 unnecessary. In other words, for many practical cases, this cause of undesired alternating voltage across impedance 30 is already negligible.

It is also possible that the A. C. voltage on the control grid 14 of the tube 10 may result in an appreciable alternating current to the suppressor grid 18 through the internal control-grid-to-suppressor-grid capacitance of the tube, interfering with the desired measurement. This effect can be neutralized, if necessary, by coupling an out-of-phase voltage from a section of the secondary winding 26 of the transformer 28 to the suppressor grid 18 through a variable capacitor 38. The amount of neutralization required can be determined by removing the D. C. operating voltage from the tube 10 while retaining the A. C. voltage on the control grid, and adjusting the capacitor 38 for zero reading on the meter 34. Alternatively, capacitive currents can be largely eliminated by proper phase adjustments where a lock-in amplifier of the type previously mentioned is used. In many cases, the adverse effects of coupling through the internal capacitance of the tube have been found to have negligible effect in measuring ion currents as small as $10^{-9}$ amperes, which is below the minimum measurement required for most purposes, so that neutralization of internal tube capacitances is usually unnecessary.

Typical operating voltages for the circuit shown in Fig. 1 may be of the order of 250 volts on the anode 20, 150 volts on the screen grid 16, minus 3 volts (D. C.) on the control grid 14, 2 volts (A. C.) on the control grid 14, and minus 5 volts on the suppressor grid 18. It will be understood that self-bias resistance in the cathode circuit may be used in place of the D. C. control grid and suppressor grid voltages shown.

A modified form of the apparatus of Fig. 1 is shown in Fig. 2, wherein an alternating voltage is applied to the cathode 12 of the tube 10 in order to vary the electron space-current in the tube, and, hence, the ionization of gas therein. In this case, the cathode 12 of the tube 10 is connected to one section of the secondary winding 26 of the transformer 28, and thence to the battery 22 through ground connections 23, 25. As in Fig. 1, the anode 20 of the screen grid 16 of the tube 10 in Fig. 2 are supplied with positive voltages from the battery 22, while negative voltages are supplied from the battery 22 to the control grid 14 and the suppressor grid 18 of the tube 10, the suppressor grid 18 again serving as an ion-collecting electrode.

In the apparatus of Fig. 2, the varying voltage supplied to the cathode 12 of the tube 10 from the A. C. voltage source 31 will cause corresponding variations in the electron space-current in the tube 10, and, in turn, will cause variations in the ion current flowing through the load resistor 30. The measuring network consisting of the amplifier 32 and the indicator 34 will function as already described in connection with Fig. 1. Possible adverse effects due to capacitive coupling between the cathode 12 and the suppressor grid 18 can be overcome by applying a small A. C. voltage, out of phase with the cathode voltage, to the control grid 12 through a potentiometer 42 connected across a portion of the secondary winding 26 of the transformer 28. The neutralizing voltage from the control grid 12 will reach the suppressor grid 18 through the control-grid-to-suppressor-grid capacitance of the tube 10. Voltages of the order of those specified for the network of Fig. 1 are also applicable in Fig. 2.

Where it is desired to measure residual gas in a pentode vacuum tube having the suppressor grid internally connected to the cathode of the tube, the embodiments of the invention shown in Figs. 3 and 4 can be used. In these embodiments of the invention, normal operating voltages are not used for the tube being tested, and the screen grid is utilized as an "anode" for the electron current in the tube.

In Figure 3, there is shown a pentode tube 50 having a suppressor grid 52 connected internally to the cathode 54. The screen grid 56 of the tube 50 is supplied with a positive voltage somewhat smaller than that used in normal operation of the tube, from a D. C. voltage source 22, while the anode 58 of the tube 50 is connected to a negative voltage point on the source 22 through a load resistor 30. The control grid 55 of the tube 50 is supplied with a small negative bias voltage from the battery 22 and is also supplied with alternating voltage from an A. C. voltage source 31 through one section of the secondary winding 26 of a transformer 28 and through a blocking capacitor 60.

The operation of the network shown in Figure 3 will be quite similar to that already described for Figures 1 and 2, with the exception that the ionizing electron space-current will flow between the cathode 54 and the screen grid 56 of the tube 50 to ionize residual gas therein, as distinguished from the usual cathode-to-anode current flow, while the anode 58 will serve as an ion collecting electrode for establishing ion current flow through the load resistor 30 in the anode circuit. The alternating voltage on the control grid 55 of the tube 50 will cause cyclical variations of the electron current in the tube, and, hence, similar variations in the ion current through the load resistor 30, as in the apparatus of Figs. 1 and 2. Neutralization of the adverse effect of control-grid-to-anode capacitance can be overcome, if necessary, by applying a small voltage, out of phase with the voltage on the control grid, from the secondary winding 26 of the transformer 28 to the anode 58 of the tube 50 through a variable capacitor 38.

The apparatus shown in Fig. 4 differs from that shown in Fig. 3 only in the manner of obtaining neutralization for the control-grid-to-anode capacitance of the tube. In Fig. 4, neutralization is obtained through the suppressor-grid-to-anode capacitance of the tube 50 by supplying the suppressor grid 52 with an out-of-phase voltage from a potentiometer 42 connected across part of the secondary winding 26 of the transformer 28, rather than by coupling the anode 58 of the tube directly to the secondary winding 26 of the transformer 28. In view of the similarity between this method of neutralization, and that shown and described for the apparatus of Fig. 2, it is believed that further discussion thereof is unnecessary.

The applicability of the principles of the invention to quantitative gas measurements with special types of vacuum tubes is illustrated in the embodiment shown in Figure 5, wherein a tube 61 to be tested is a so-called beam-deflection-mixer tube, of the general type described in U. S. Patent No. 2,434,713—Mueller. The tube comprises a cathode 62, a cathode shield 63, an aperture frame 64, two sets of deflections plates 65, 66, a beam intercepting wire 67, a suppressor electrode 68, and an anode 69.

In accordance with the invention, the "masking" of ion currents by leakage currents, which have been found to be particularly prevalent in tubes of this type, can be overcome by using the apparatus shown in Figure 5. The aperture frame 64, one of the sets of deflecting plates 66, and the intercepting wire 67 are supplied with a positive voltage of the order of 300 volts from a D. C. voltage source 22, and the cathode shield 63 is supplied with a negative voltage of the order of minus 3 volts from the source 22, while the anode 69 is supplied with a negative voltage of the order of minus 6 volts through one of the contacts 70a of a switch 70 and through a load resistor 30. The other set of deflecting plates 65 of the tube 61 is coupled to an A. C. voltage source 31 through a transformer 28 and a variac 27, and is also connected to the D. C. voltage source 22 at a voltage point of the order of 140 volts through the secondary winding 26 of the transformer 28 and through a deflection-balancing network 21. An A. C. amplifier 32 and indicator 34 are connected across the load resistor 30 through a coupling capacitor 36, as in the apparatus of Figs. 1 through 4.

In using the apparatus shown in Fig. 5, the variac 27 is adjusted for zero A. C. voltage to the deflection plates 65, and the switch 70 is moved to connect the anode 69 of the tube 61 to the battery 22 through the upper switch contact 70b. The relative D. C. voltage on the deflecting plates 65 is then adjusted by means of the balancing network 21 to center the cathode ray beam from the cathode 62 on the intercepting wire 67. With the switch 70 moved to connect the anode 69 of the tube 61 to the lower switch contact 70a, the A. C. voltage to the deflection plates 65 is adjusted by means of the variac 27 so that the cathode ray beam will enter the suppressor-anode region 68' of the tube 61 during each half cycle of alternating voltage applied to the deflection plates 65. In the case of a 60 cycle deflection voltage, gas ions will be created in the suppressor-anode region 68' during each half cycle of deflection voltage, or at a rate of 120 cycles per second. The resultant undulating ion current through the resistor 30 will generate a cyclically varying component of voltage across the resistor 30 which will pass through the capacitor 36 to the amplifier 32 and the indicator 34. By eliminating the masking effect of D. C. leakage currents in the foregoing manner, it has been found that the sensitivity of ion current gas measurements can be increased by a factor of from ten to a hundred as compared with prior art methods even with no selectivity in the amplifier or special capacitance neutralization.

While the foregoing illustrative embodiments of the invention have all been described in connection with particular types of vacuum tubes, it will be apparent that the same principles are equally applicable to other types of tube containing a plurality of electrodes. For example, in the case of a triode vacuum tube, the control grid can be used to collect electrons in the tube, and the anode of the tube can be used as an ion collector, while the cathode voltage can be varied cyclically to produce the varying ionization contemplated in the present invention. However, the interelectrode capacitance problem is somewhat more serious in the case of triodes than with tetrodes or pentodes, so that apparatus wherein varying ionization is obtained without applying a varying voltage to any one of the tube electrodes is sometimes preferable. An arrangement of this kind is illustrated in Fig. 6, wherein ionization of gas is controlled electromagnetically.

In Figure 6, the tube 71 to be tested is subjected to a cyclically varying magnetic field aligned at right angles to the direction of normal electron current flow (i. e. from cathode to anode) within the tube. A cyclically-varying-magnetic-field generator 72 is provided, comprising a coil 73 coupled to a source of alternating voltage 31, and is so placed with respect to the tube 71 that current flowing in the coil 73 will establish a magnetic field which will be parallel to the longitudinal axis of the tube 71, and, hence, at right angles to the normal direction of electron motion in the tube 71. This is illustrated in Fig. 7, wherein there is shown a top plan view of a triode tube 71 with the upper portion of the tube removed to show the coaxially arranged anode 74, control grid 76, and cathode 78 of the tube. The normal motion of electrons within the tube 71 in Figure 6 is from the cathode 78 to the anode 74 (along the dotted lines 80). The coil 73 surrounds the tube 71 in Fig. 7, so that the magnetic field due to the coil 73 will be directed either into or out of the plane of the drawing, depending on the direction of current flow in the coil 73 at any one instant, but in either event, at right angles to the direction of normal electron motion. As shown in Fig. 6, the anode 74 and the cathode 78 of the tube 71 are connected to a source of D. C. voltage 22 in the usual manner for normal operation of the tube, and the control grid 76 is connected to a negative volttage point on the source 22 through a load resistor 30, while an A. C. amplifier 32 and indicator 34 are connected across the resistor 30 through a blocking capacitor 36.

Referring, again, to Fig. 7, the varying magnetic field through the tube 71 will cause the electrons in the tube 71 to travel along paths 82 of varying length within the tube 71, thereby causing ionization of more or less of the gas within the tube at any given instant, depending on the length of the electron paths at that instant. The resultant ion current through the resistor 30 (Fig. 6) will vary cyclically, and the cyclical variations can be selectively amplified and measured by the amplifier 32 and the meter 34, as in the network shown in Figures 1 thru 5.

In order to avoid electrostatic coupling between the coil 73 and the tube electrodes 74—78 in the apparatus of Fig. 6, a grounded electrostatic shield 81 can be placed between the magnetic field generator 72 and the circuits for the tube 71. The construction of such a shield is preferably such that shield currents due to the alternating magnetic field are prevented from flowing or having a "short-circuited turn" effect. This can be done by insulating the ends of shielding conductors which, if touching, would constitute a complete conductive path linking the magnetic flux. It is also well to avoid inductive coupling between the coil 73 and the tube circuits as much as possible. This, of course, can be done by proper arrangement of the connecting leads for the tube 71 with respect to the coil circuit. Fortunately, the most important tube circuit in this respect is the circuit for the ion-collecting electrode (i. e. the control grid 76 in Fig. 6), and since the collecting electrode 76 is maintained at a negative potential, the collecting electrode circuit is substantially an open circuit in which magnetic induction currents cannot be established, so that the induction problem is quite negligible in most cases.

It is apparent that the embodiment of the invention illustrated by Figs. 6 and 7 is not limited in applicability to triode tubes, but can be used with almost any type of vacuum tube, and is subject to considerable variation within the scope of the invention.

The appliability of the foregoing principles to the problem of small leak detection (as distinguished from the actual location of such leaks) should be apparent. Extremely low pressure measurements can be made with the methods and apparatus already described, making it possible to detect internal pressure changes well before the gas content of a tube under test has increased sufficiently to cause damage to the tube. This, of course, is especially important in the case of special type tubes, such as the beam-mixer tube 61 in Fig. 5, since the relatively high unit cost of such tubes makes it worthwhile to detect and seal up leaks before any damage results therefrom. The application of the principles of the problem of accurately locating leaks in vacuum systems will be brought out in the discussion of Figures 8–12 of the drawings.

As was previously mentioned, the most sensitive prior art methods for detecting and locating small leaks in vacuum tubes or vacuum systems involve scanning the surface of the tube with a special tracer gas, such as hydrogen or helium, and using special instruments, such as a palladium-diaphragm ion gage, or a mass spectrometer, to obtain an indication of changes in the amount of tracer gas in the tube.

In accordance with the invention, the problems inherent in prior art leak-location techniques can be overcome by scanning the surface of the tube to be tested with a cyclically varying stream of gas from a stream-forming nozzle so as to alternately build up and decrease the concentration of gas just outside the leak in the system. The amount of gas inside the tube will increase at a corresponding cyclic rate, and the resulting cyclical variations in ion current can be relied on to distinguish between gas entering the tube through the leak during testing, and any gas previously present in the system. It is apparent that this method does not require the use of any particular gas, nor the withdrawal of any gas from the tube during the test. Accordingly, no apparatus is required for detecting a special kind of gas, nor is it necessary that the tube being tested be coupled to an evacuating system.

Referring to Fig. 8, there is shown apparatus for locating leaks in a sealed tube 90 in accordance with the invention. To simplify the drawing, the tube 90 in Fig. 8 is illustrated as having a leakage opening 92 in one wall thereof through which gas may enter the tube 90, although in the usual case it is likely that the leak would appear in a less conspicuous place. A stream-forming nozzle 94, for scanning the surface of the tube 90 with a stream of gas, is connected to a source of compressed gas, such as a compressor 98, through a flexible conduit 96 which is provided with a pressure-modulating valve 100 for cyclically varying the flow of test gas from the nozzle 94. Figures 9, 10 and 11 show three positive types of modulating valves which may be used for the valve 100 in the apparatus of Figure 8.

The pressure modulating valve shown in Fig. 9 comprises a solenoid winding 102 having an armature 104 disposed at right angles to the conduit 96. A backing member 106 is provided to cooperate with the armature 104 in varying the cross-sectional dimensions of the conduit 96. The solenoid winding 102 is connected to a source of alternating current 31 for vibrating the armature 104. As the conduit 96 is alternately compressed and released by movements of the armature 104, the pressure of the gas flowing through the conduit 96 will vary in synchronism therewith.

The modulating valve shown in Figure 10 is similar to that shown in Figure 9, with the exception that an eccentrically mounted rotating cam 112, driven by a motor 114, has been substituted for the vibrating armature 104 and the solenoid 102 shown in Figure 9. As the cam 112 is rotated, the cross-sectional dimensions of the conduit 96 will be varied, causing corresponding variations in the flow of gas therethrough.

In the modulating valve arrangement shown in Fig. 11, the conduit 96 is connected to a chamber 116 having flap-type inlet and outlet valves, 118 and 120, respectively. A diaphragm 121 is mounted in one wall of the chamber 116 and is provided with electromagnetic driving means comprising an armature 122 driven by a coil 124, similar to the structure of an ordinary loudspeaker, the arrangement being such that alternating voltage applied to the operating coil 124 from a source of A. C. voltage 31 will cause the diaphragm 121 to vibrate, thereby producing variations in the internal dimensions of the valve chamber 116, and causing corresponding variations in the flow of gas from the chamber 116.

Referring, again, to Fig. 8, the cathode 91 and the anode 95 of the tube 90 are connected to a source of D. C. voltage 22 for generating an ionizing electron space-current in the tube 90, while the control grid 93 of the tube 90 is supplied with a negative, ion-collecting voltage from the battery 22 through a load resistor 30. An A. C. amplifier 32 and indicator 34 are connected across the load resistor 30 through a blocking capacitor 36.

As the surface of the tube 90 is scanned with the cyclically varying gas stream from the nozzle 94, the gas content of the tube 90 will increase at a cyclically varying rate when the nozzle 94 passes over the leak 92 in the wall of the tube 90. The ion current flowing through the load resistor 30 will vary similarly, and the varying component of voltage across the resistor 30 will produce a response on the meter 34. When the meter 34 responds, the operator will know that there is a leak in the surface of the tube 90 in the immediate vicinity of the nozzle 94, whereupon the necessary steps can be taken to repair the tube.

It is apparent that the foregoing procedure is equally applicable to the testing of sealed tubes which have been disconnected from the evacuating system, as in Fig. 8, and to the testing of tubes during evacuation thereof. In the latter case, the sensitivity of ordinary ionization gages, (see e. g. Strong-Procedures in Experimental Physics, page 143) or of special ionization gages, such as the previously mentioned hydrogen-palladium gage or the mass spectrometer gage, can be substantially improved by utilizing the method herein described. An apparatus of this kind is shown in Fig. 12, wherein a tube 128 to be tested for leaks is shown connected to an evacuating pump 130 through a conduit 132 containing a shut-off valve 134. An ionization gage 136, of any of the types mentioned above, is connected to a branch conduit 138 of the evacuating system so as to monitor the pressure in the tube 128 and in the associated vacuum lines. The gage 136 is electrically connected to a measuring network 140 which comprises the elements 34, 36 shown in Fig. 8. A scanning nozzle 94 is connected to a source of compressed gas 142 through a conduit 96 having a shut off valve 144 and a pressure modulating valve 100 of the type mentioned in connection with Figs. 8 through 11. By modulating the flow of testing gas through the nozzle 94 at a low rate, say of the order of 15 cycles per minute, the measuring network 140 connected to the ionization gage will only respond when a cyclical variation of gas pressure occurs in the tube 90, thereby eliminating substantially unvarying effects due to residual gas and the like.

It is to be noted that apparatus similar to that shown in Fig. 8 or in Fig. 12 can be used for simple leak detection in those cases where it is unnecessary to actually locate the leak, as in production-line testing, where unsatisfactory units are ordinarily not repaired. In this case, the nozzle 94 in Fig. 8 or in Fig. 12 can be replaced with a chamber surrounding the tube being tested. As the gas pressure in the chamber fluctuates, corresponding fluctuations in the internal gas pressure of the tube can be detected and indicated as in the case of leak location previously described.

While the invention has been described with particular reference to vacuum tubes, it will be understood that the method and apparatus disclosed herein are equally applicable to measurement of the gas content of other analogous types of evacuated envelopes. Accordingly, the foregoing is to be construed as illustrative, and not in a limiting sense.

What is claimed is:

1. An ion-current type quantitative gas-measuring apparatus adapted to distinguish between currents developed from ions of the gas to be measured and other interfering electric currents, said apparatus comprising a circuit including a pair of electrodes for ionizing the gas to be measured, a second circuit including a third electrode connected to collect ions of said gas to develop an ion current from collected ions of said gas, means for cyclically varying the ionization of said gas whereby to produce cyclical variations in said ion current, and alternating current responsive measuring means coupled to said second circuit and responsive to said cyclical variations in said ion current.

2. An ion-current type quantitative gas-measuring apparatus adapted to distinguish between currents developed from ions of the gas to be measured and other interfering electric currents, said apparatus comprising a circuit including a pair of electrodes for ionizing the gas to be measured, means for cyclically varying the amount of gas to be measured, a second circuit including an additional electrode connected to collect ions of the gas to be measured to develop a cyclically varying ion current from collected ions of said gas, and alternating current responsive measuring means coupled to said second circuit and responsive to said cyclical variations in said ion current.

3. An ion-current type quantitative gas-measuring apparatus adapted to distinguish between currents developed from ions of the gas to be measured and other interfering electric currents, said apparatus comprising a circuit including a pair of electrodes for ionizing the gas to be measured, a second circuit including a third electrode connected to collect ions of said gas to develop a cyclically varying ion current from collected ions of said gas, a third circuit for cyclically varying the ionizing effect of said first circuit on said gas, and alternating current responsive measuring means coupled to said second circuit and responsive to said cyclical variations in said ion current.

4. An ion-current type quantitative gas-measuring apparatus adapted to distinguish between currents developed from ions of the gas to be measured and other interfering electric currents, said apparatus comprising an electron space-current generating circuit for establishing an ionizing electron current through the gas to be meaured whereby to ionize said gas, a second circuit for cyclically varying said electron current to cyclically vary the ionization of said gas, an ion-collecting electrode disposed in said gas, a third circuit including said collecting electrode for developing a cyclically varying ion current from collected ions of said gas, and alternating current responsive measuring means coupled to said third circuit and responsive to said cyclical variations in said ion current.

5. Apparatus for measuring the amount of gas in a vacuum tube having a plurality of electrodes, said apparatus comprising a source of D. C. voltage, a first circuit including said D. C. voltage source for establishing an ionizing electron current between two of said electrodes whereby to ionize the gas in said tube, a second circuit including said D. C. voltage source connected to collect ions of said gas at another of said electrodes whereby to develop an ion current in said second circuit from collected ions of said gas, a source of A. C. voltage, a third circuit for applying alternating voltage from said A. C. voltage source to one of said plurality of electrodes whereby to cyclically vary said ionizing electron current and hence said ion current, and measuring means coupled to said second circuit and responsive to cyclical variations in said ion current.

6. Apparatus as defined in claim 5, wherein said measuring means comprises an A. C. amplifier and an indicator coupled to said amplifier.

7. Apparatus as defined in claim 5 wherein said third circuit includes a transformer having a primary winding connected to said cyclically varying voltage source and having a secondary winding for applying cyclically varying out-of-phase voltages to said one electrode and said another electrode whereby simultaneously to vary said electron current and to neutralize the effects of capacitive coupling between said one electrode and said another electrode.

8. Apparatus as defined in claim 7 wherein said one electrode is also one of said two electrodes.

9. Apparatus for measuring the amount of gas in a vacuum tube having an anode, a cathode, a control grid, a screen grid, and a suppressor grid, said apparatus comprising a load impedance, D. C. voltage source means for supplying a voltage positive with respect to said cathode to said screen grid and for supplying a voltage negative with respect to said cathode to said anode through said load impedance, a source of alternating voltage, means coupled to said alternating voltage source for supplying a first alternating voltage to said control grid and for supplying a second alternating voltage out of phase with respect to said first alternating voltage to said anode, and a measuring network coupled to said load impedance for measuring cyclically varying voltages across said load impedance.

10. Apparatus for measuring the amount of gas in a vacuum tube having an anode, a cathode, a control grid, a screen grid, and a suppressor grid, said apparatus comprising a load impedance, D. C. voltage source means for supplying voltages positive with respect to said cathode to said anode and to said screen grid and for supplying a voltage negative with respect to said cathode to said suppressor grid through said load impedance, a source of alternating voltage, means including a transformer coupled to said alternating voltage source for supplying a first alternating voltage to said control grid and for supplying a second alternating voltage out of phase with respect to said first alternating voltage to said suppressor grid, and a measuring network coupled to said load impedance for measuring cyclically varying voltages across said load impedance.

11. Apparatus for measuring the amount of gas in a vacuum tube having an anode, a cathode, a control grid, a screen grid, and a suppressor grid, said apparatus comprising a load impedance, D. C. voltage source means for supplying a voltage positive with respect to said cathode to said screen grid and for supplying a voltage negative with respect to said cathode to said anode through said load impedance, a source of alternating voltage, means including a transformer coupled to said alternating voltage source for supplying a first alternating voltage to said control grid and for supplying a second alternating voltage out of phase with respect to said first alternating voltage to said cathode, and a measuring network coupled to said load impedance for measuring cyclically varying voltages across said load impedance.

12. Apparatus for measuring the amount of gas in a beam deflection vacuum tube having (1) a cathode, (2) an aperture frame, (3) a pair of deflection plates, (4) an intercepting wire, (5) a suppressor electrode, and (6) an anode electrode, said apparatus comprising a source of D. C. voltage, a first circuit including said D. C. voltage source for establishing a beam of electrons directed from said cathode toward said anode whereby to ionize gas in said tube, a load impedance, a second circuit including said voltage source and said load impedance for collecting gas ions at said anode whereby to develop an ion current in said second circuit from collected ions of said gas, a source of alternating voltage for establishing a cyclically varying beam deflecting field between said deflection plates, and a measuring network coupled to said second circuit for measuring cyclical variations in said ion current.

13. An ion-current type quantitative gas-measuring apparatus adapted to distinguish between currents developed from ions of the gas to be measured and other interfering electric currents, said apparatus comprising a circuit including a pair of electrodes for ionizing the gas to be measured, a second circuit including a third electrode connected to collect ions of said gas to develop an ion current from collected ions of said gas, electromagnetic means to establish a varying electromagnetic field in the area around said pair of electrodes for cyclically varying the ionization of said gas by said ionizing means whereby to produce distinguishing cyclical variations in said ion current, and alternating current responsive measuring means coupled to said circuit means and responsive to said cyclical variations in said ion current.

14. An ion-current type quantitative gas-measuring apparatus adapted to distinguish between currents developed from ions of the gas to be measured and other interfering electric currents, said apparatus comprising electron space-current generating means for establishing an ionizing electron current through the gas to be measured whereby to ionize said gas, electromagnetic means for cyclically varying the path-length of said electron current through said gas whereby to cyclically vary the amount of gas being ionized, an ion-collecting electrode disposed in said gas, circuit means connected to said collecting electrode for developing a cyclically varying ion current from collected ions of said gas, and measuring means coupled to said circuit means and responsive to cyclical variations in said ion current.

15. Apparatus for measuring the amount of gas in a vacuum tube having a plurality of electrodes, said apparatus comprising a source of D. C. voltage, a first circuit including said D. C. voltage source for establishing an ionizing electron current between two of said electrodes whereby to ionize the gas in said tube, a second circuit including said D. C. voltage source for collecting ions of said gas at another of said electrodes whereby to develop an ion current in said second circuit from collected ions of said gas, a cyclically-varying-magnetic-field generator for establishing a cyclically varying magnetic field through said tube at right angles to the direction of flow of said ionizing electron current whereby to cyclically vary the path-length of said electron current through said gas and hence the ionization of said gas by said electron current, and measuring means coupled to said second circuit and responsive to cyclical variations in said ion current.

16. Apparatus for measuring the amount of gas in a triode vacuum tube having an anode, a cathode, and a control grid, said apparatus comprising a source of D. C. voltage, a first circuit including said D. C. voltage source for establishing an ionizing electron current between said cathode and said anode whereby to ionize the gas in said tube, a load impedance, a second circuit including said voltage source and said load impedance for collecting ions of said gas at said control grid whereby to develop an ion current in said second circuit from collected ions of said gas, an alternating magnetic field generator for establishing a cyclically varying magnetic field through said tube at right angles to the direction of flow of said ionizing electron current whereby to cyclically vary the path length of said electron current through said gas and hence the ionization of said gas by said electron current, and a measuring network coupled to said second circuit and responsive to cyclical variations in said ion current.

17. A gas-scanning, ion-current type leak locating apparatus which distinguishes between ion currents developed from gas which enters an envelope through a leakage opening therein as said envelope is being tested for leaks and other interfering electric currents, said apparatus comprising means for ionizing said gas, a circuit for collecting ions of said gas whereby to develop an ion current from collected ions of said gas, a cyclically-varying-gas-stream source for scanning the surface of said envelope with a cyclically varying stream of gas whereby to cyclically vary the gas content of said envelope as said gas stream passes over said leakage opening and hence to cyclically vary said ion current, and a measuring network coupled to said circuit and responsive to cyclical variations of said current in said circuit.

18. Apparatus as defined in claim 17 wherein said gas-stream source comprises (1) a source of compressed gas, (2) a stream-forming nozzle, (3) a conduit connecting said nozzle to said compressor, and a pressure-modulating valve in said conduit for varying the pressure of gas flowing from said gas source to said nozzle through said conduit.

19. Apparatus as defined in claim 18 wherein said pressure modulating valve comprises a chamber having a diaphragm mounted in one wall thereof, and electromagnetic driving means connected to said diaphragm for vibrating said diaphragm.

20. Apparatus for locating a leak in an evacuated envelope by measuring the gas content of said envelope while scanning the surface of said envelope with a stream of gas, said apparatus comprising electron space-current generating means for establishing an ionizing current of electtrons through the gas to be measured, a circuit for collecting ions of said gas whereby to develop in said circuit an ion current from collected ions of said gas, a cyclically-varying-gas-stream source for scanning the surface of said envelope with a cyclically varying gas stream whereby to cyclically vary the gas content of said envelope as said gas stream passes over said leak and hence to cyclically vary said ion current, and a measuring network coupled to said circuit and responsive to cyclical variations of said ion current in said circuit.

21. Apparatus for locating a leak in a vacuum tube having a plurality of electrodes, said apparatus comprising a first circuit for establishing an ionizing electron current between two of said electrodes whereby to ionize gas in said tube, a second circuit for collecting ions of said gas at another of said electrodes whereby to develop an ion current in said second circuit from collected ions of said gas, a cyclically-varying-gas-stream source for scanning the surface of said tube with a cyclically varying stream of gas whereby to cyclically vary the gas content of said tube as said gas stream passes over said leak and hence to cyclically vary said ion current, and a measuring network coupled to said circuit and responsive to cyclical variations of said ion current in said circuit.

22. Apparatus as defined in claim 21 wherein said gas-stream source comprises (1) a gas compressor, (2) a stream-forming nozzle, (3) a conduit connecting said nozzle to said compressor, and a pressure-modulating valve in said conduit for varying the pressure of gas flowing from said compressor to said nozzle through said conduit.

23. In a method of locating leaks in an evacuated envelope by measuring ion currents developed from gas which enters said envelope through a leakage opening therein as said envelope is being tested for leaks, the steps of generating a cyclically varying stream of gas, scanning the surface of said envelope with said gas stream whereby to cyclically vary the gas content of said envelope as said gas stream passes over said leakage opening, ionizing the gas from said gas stream which enters said envelope through said leakage opening, collecting ions of said gas whereby to develop a cyclically varying ion current from the cyclically varying gas-ion content of said envelope, and measuring only cyclical variations in said ion current.

24. In a method of locating leaks in a sealed vacuum tube having a plurality of electrodes, the steps of generating a cyclically varying stream of gas, scanning the surface of said envelope with said gas stream whereby to cyclically vary the gas content of said envelope as said gas stream passes over said leakage opening, generating an electron space-current between two of said electrodes whereby to ionize gas entering said tube through said leakage opening, collecting ions of said gas at another of said electrodes whereby to develop a cyclically varying ion current in a circuit connected to said another electrode, and measuring only cyclical variations in said ion current.

EDWARD W. HEROLD.

REFERENCES CITED

The following references are of record in the file of this patent:

UNITED STATES PATENTS

| Number | Name | Date |
|---|---|---|
| 2,375,280 | Calbick | May 8, 1945 |
| 2,454,564 | Nelson | Nov. 23, 1948 |